(12) United States Patent
Abusleme et al.

(10) Patent No.: US 8,642,702 B2
(45) Date of Patent: Feb. 4, 2014

(54) VDF POLYMER COMPOSITION

(75) Inventors: Julio A. Abusleme, Saronno (IT); Stefano Mortara, Arconate (IT)

(73) Assignee: Solvay Specialty Polymers Italy S.p.A., Bollate MI (IT)

( * ) Notice: Subject to any disclaimer, the term of this patent is extended or adjusted under 35 U.S.C. 154(b) by 0 days.

(21) Appl. No.: 13/643,339

(22) PCT Filed: Apr. 26, 2011

(86) PCT No.: PCT/EP2011/056545
§ 371 (c)(1),
(2), (4) Date: Oct. 25, 2012

(87) PCT Pub. No.: WO2011/134941
PCT Pub. Date: Nov. 3, 2011

(65) Prior Publication Data
US 2013/0037754 A1  Feb. 14, 2013

(30) Foreign Application Priority Data
Apr. 30, 2010  (EP) .................................... 10161656

(51) Int. Cl.
*C08F 8/00* (2006.01)
*C08L 23/04* (2006.01)
(52) U.S. Cl.
USPC ............................ 525/199; 525/200; 525/240
(58) Field of Classification Search
USPC ........................................ 525/199, 200, 240
See application file for complete search history.

(56) References Cited

U.S. PATENT DOCUMENTS

| 4,748,204 A | 5/1988 | Kawashima et al. |
| 5,908,704 A | 6/1999 | Friedman et al. |
| 6,025,436 A | 2/2000 | Kawashima et al. |
| 2003/0004303 A1 | 1/2003 | Khan et al. |
| 2009/0203830 A1* | 8/2009 | Abusleme et al. ............ 524/520 |

FOREIGN PATENT DOCUMENTS

| JP | 3-163147 A | 7/1991 |
| JP | 4-1253 A | 1/1992 |
| WO | WO 0138076 A1 | 5/2001 |
| WO | WO 2009026284 A2 | 2/2009 |

OTHER PUBLICATIONS

Alger Mark S.M., "Polymer Science Dictionary", 1989, London School of Polymer Technology, Polytechnic of North London, UK published by Elsevier Applied Science, pp. 476-477; 4 pgs.

* cited by examiner

*Primary Examiner* — Nathan M Nutter
(74) *Attorney, Agent, or Firm* — Osha Liang LLP

(57) ABSTRACT

The invention pertains to a thermoplastic VDF polymer composition comprising: at least one thermoplastic vinylidene fluoride (VDF) polymer comprising at least 85% by moles of recurring units derived from VDF; and at least one ethylene/chlorotrifluoroethylene (ECTFE) polymer, wherein said ECTFE polymer possesses a melting point of less than 210° C. and it is comprised in an amount of from 0.1 to 20% wt with respect to the total weight of VDF polymer and ECTFE polymer. The invention also pertains to a process for making the VDF polymer and to the uses thereof for manufacturing films, in particular transparent films.

16 Claims, No Drawings

VDF POLYMER COMPOSITION

CROSS-REFERENCE TO RELATED APPLICATIONS

This application is a U.S. national stage entry under 35 U.S.C. 371 of International Application No. PCT/EP2011/056545 filed Apr. 26, 2011, claims priority to European application No. 10161656.3 filed Apr. 30, 2010, the whole content of this application being incorporated herein by reference for all purposes.

TECHNICAL FIELD

The invention pertains to novel VDF polymers compositions having improved mechanical properties/optical behaviour compromise, which are useful for the manufacture of transparent films.

BACKGROUND ART

Thermoplastic vinylidene fluoride (VDF) polymers are fluoropolymers well known for their outstanding properties, including barrier properties (e.g. against oxygen and/or water), chemical resistance, mechanical properties, weatherability; it is generally understood that these mechanical properties are correlated with the crystalline phase of said thermoplastic VDF polymers, materialized in terms of heat of fusion and melting temperature of said polymer.

Also, high melting point VDF polymers are generally preferred when high temperature rating is required, e.g. for applications in extreme temperature conditions.

It is also widely recognized that certain uses of VDF polymers, in particular of VDF polymer films, require the material to be transparent to visible light and to be translucent, so as no deviation of incident light occurs.

Nevertheless, transparency and translucency are properties which can be achieved through behaviour of the amorphous phase of said VDF polymers.

General approaches for obtaining transparent and translucent articles are based on VDF copolymers, e.g. by incorporation of fluoromonomers like hexafluoropropylene (HFP) or chlorotrifluoroethylene (CTFE). These modifying comonomers are well-known for their ability of preventing crystallization of otherwise regular sequences of VDF recurring units in the polymer chain, by introducing 'defects', so that copolymer containing the same have their crystallinity substantially reduced with respect to VDF homopolymers.

While thus amorphous character by means of these approaches is enhanced, with corresponding improvement of transparency and translucency, otherwise barrier properties, chemical resistance, mechanical properties, weatherability and thermal rating are consequently negatively affected.

Now, several fields of use exist wherein any of above mentioned properties combined with outstanding transparency and look-through capabilities are required. As non limitative examples, mention can be made of protective films for photovoltaic modules, transportation, industrial and food packaging, pharmaceuticals storage and packaging and the like.

There is thus still a current shortfall in the art for thermoplastic VDF polymer compositions offering an improved compromise between barrier properties, chemical resistance, mechanical properties, weatherability and thermal rating, from one side, and transparency and translucency, on the other side.

On the other side, compositions wherein thermoplastic VDF polymers have been combined variously with certain ethylene-chlorotrifluoroethylene (ECTFE) polymers have been described in the art.

Thus, U.S. Pat. No. 5,908,704 (NORTON PERFORMANCE PLASTICS CO) Jan. 6, 1999 is directed to THV-based compositions for protective glazing applications; the addition of ECTFE in THV in amounts of 1 to 30% is taught to yield semi-opaque films having a haze value of 4-25%. Specific working embodiments are provided, pertaining to THV-ECTFE compounds comprising from 10 to 90% ECTFE and possessing haze values (under the form of films) of 10 to 50%, thus corresponding to non translucent items. ECTFE resin used is HALAR® 300 ECTFE resin, which is known to possess a melting point of 240° C.

Similarly, WO 01/38076 (LITHIUM POWER TECHNOLOGIES INC) May 31, 2001 is directed, inter alia, to certain VDF polymer-based compositions incorporating therein another fluoropolymer; among a long list, mention is also made of ECTFE polymers. No specific example of a blend of PVDF and ECTFE is provided. Among embodiments provided therein, an approach is directed to the improvement of high temperature features of PVDF by incorporation of said second fluoropolymer: to this aim, the second fluoropolymer is selected among those which are temperature resistant up to 250° C., while PVDF is taught as being merely temperature stable up to 175° C.

WO 2009/026284 (3M INNOVATIVE PROPERTIES) Feb. 26, 2009 discloses solvent-coating compositions comprising a first fluoropolymer soluble in a solvent and a second fluoropolymer insoluble in said solvent. Among a long list of 'soluble' fluoropolymers, mention is made of VDF polymers; among a long list of 'insoluble' fluoropolymers, ECTFE is mentioned but no specific example is directed to this combination. Matching of refractive index among the two fluoropolymers is taught as guidance for obtaining transparent films.

None of the prior art discloses nor fairly suggest a thermoplastic VDF polymer composition possessing an improved compromise between transparency/translucency properties and barrier properties, chemical resistance, mechanical properties, weatherability and thermal rating.

DISCLOSURE OF INVENTION

It is thus an object of the present invention a thermoplastic VDF polymer composition which is advantageously endowed with an improved compromise of transparency/translucency properties and barrier properties, chemical resistance, mechanical properties, weatherability and thermal rating and which possesses outstanding mechanical and thermal properties of semi-crystalline VDF polymers, while having enhanced transparency/translucency.

More precisely, the invention pertains to a thermoplastic VDF polymer composition comprising:
- at least one thermoplastic vinylidene fluoride (VDF) polymer, comprising at least 85% by moles of recurring units derived from VDF; and
- at least one ethylene/chlorotrifluoroethylene (ECTFE) polymer, wherein said ECTFE polymer possesses a melting point of less than 210° C. and it is comprised in an amount of from 0.1 to 20% wt with respect to the total weight of VDF polymer and ECTFE polymer.

The Applicant has surprisingly found that the addition of said particular ECTFE polymer having low melting point and in said above detailed amounts enables significantly improving transparency/translucency of the VDF polymers without negatively affecting barrier properties, chemical resistance, mechanical properties, weatherability and thermal rating.

Comparative tests carried out by the Applicant have also demonstrated that when the ECTFE polymer possesses a melting temperature exceeding 210° C., transparency/translucency is negatively affected and Haze values are significantly increased.

Further, when the ECTFE polymer additive is used in amounts exceeding 20% wt, other relevant properties of the host VDF polymers are affected, so that target combination of barrier, mechanical and thermal properties with optical properties is not obtained.

The Applicant has observed, without this limiting the scope of the invention, that, at least in certain cases, the addition of the ECTFE polymer as above detailed provides for a decrease of the sizes of the spherulites of the crystalline domains of the host VDF polymer; while not being bound by this theory, this decrease can advantageously justify for both improved transparency/translucency, but also for improved surface flatness or reduced surface roughness. This latter property is particularly relevant for high purity application, wherein absence of roughness patterns on the surface avoid deposits and proliferation of contaminants in containers or pipelines.

The VDF polymer used in the composition of the invention is thermoplastic. The term "thermoplastic" is understood to mean, for the purposes of the present invention, polymers existing, at room temperature, below their glass transition temperature, if they are amorphous, or below their melting point if they are semi-crystalline, and which are linear (i.e. not reticulated). These polymers have the property of becoming soft when they are heated and of becoming rigid again when they are cooled, without there being an appreciable chemical change. Such a definition may be found, for example, in the encyclopaedia called "Polymer Science Dictionary", Mark S. M. Alger, London School of Polymer Technology, Polytechnic of North London, UK, published by Elsevier Applied Science, 1989.

The VDF polymer preferably comprises:
(a') at least 80% by moles, preferably at least 85% by moles, more preferably at least 90% by moles of vinylidene fluoride (VDF);
(b') optionally from 0.1 to 15%, preferably from 0.1 to 12%, more preferably from 0.1 to 10% by moles of a fluorinated comonomer chosen among vinylfluoride (VF), chlorotrifluoroethylene (CTFE), hexafluoropropene (HFP), tetrafluoroethylene (TFE), perfluoromethylvinylether (MVE), trifluoroethylene (TrFE) and mixtures therefrom; and
(c') optionally from 0.1 to 5%, by moles, preferably 0.1 to 3% by moles, more preferably 0.1 to 1% by moles, based on the total amount of monomers (a') and (b'), of one or more hydrogenated comonomer(s).

As non limitative examples of the VDF polymers useful in the present invention, mention can be notably made of homopolymers of VDF, VDF/TFE copolymers, VDF/TFE/HFP copolymers, VDF/TFE/CTFE copolymers, VDF/TFE/TrFE copolymers, VDF/CTFE copolymers, VDF/HFP copolymers, VDF/TFE/HFP/CTFE copolymers, VDF/TFE/perfluorobutenoic acid copolymers, VdF/TFE/maleic acid copolymers and the like.

Most preferably the VDF polymer is selected from the group consisting of VDF homopolymers and copolymers of VDF with 0.1 to 10% by moles of a fluorinated comonomer chosen from the group consisting of chlorotrifluoroethylene (CTFE), hexafluoropropene (HFP), tetrafluoroethylene (TFE), trifluoroethylene (TrFE) and mixtures thereof.

The VDF polymer has a melting point advantageously of at least 120° C., preferably at least 135° C., more preferably at least 150° C.

The VDF polymer has a melting point advantageously of at most 190° C., preferably at most 185° C., more preferably at most 180° C.

The melting point ($T_{m2}$) is determined by DSC, at a heating rate of 10° C./min, according to ASTM D 3418.

With the aim of optimizing mechanical properties related to the crystalline structure of the polymer chain, the VDF polymer has preferably a heat of fusion of at least 10 J/g, preferably of at least 20 J/g, most preferably of 40 J/g.

The heat of fusion is determined by DSC, at a heating rate of 10° C./min, according to ASTM D 3418.

As used herein the terms "ethylene/chlorotrifluoroethylene polymer" and "ECTFE" are used interchangeably to designate fluoropolymers comprising ethylene and chlorotrifluoroethylene as the major monomer components and optionally one or more hydrogenated or fluorinated comonomer(s). ECTFE polymers typically comprise:
(a) from 10 to 90%, preferably from 30 to 70 by moles of ethylene (E);
(b) from 90 to 10%, preferably from 70 to 30%, by moles of chlorotrifluoroethylene (CTFE); and
(c) from 0 to 30%, preferably from 0.1 to 15% by moles, based on the total amount of monomers (a) and (b), of one or more fluorinated and/or hydrogenated comonomer(s).

Non limiting examples of fluorinated comonomers are for instance perfluoroalkylvinylethers, perfluoroalkylethylenes (such as perfluorobutylethylene), perfluorodioxoles, vinylidenefluoride. Among them, the preferred comonomer is perfluoropropylvinylether of formula

$CF_2=CFO-C_3F_7$.

Non limiting examples of hydrogenated comonomers, are those having the general formula: $CH_2=CH-(CH_2)_nR_1$ wherein $R_1=OR_2$, or $-(O)_tCO(O)_pR_2$ wherein t and p are integers equal to 0 or 1 and $R_2$ is H or a hydrogenated linear or branched alkyl or cycloalkyl radical having from 1 to 20 carbon atoms, optionally containing heteroatoms and/or chlorine atoms, the heteroatoms preferably being O or N; $R_2$ optionally contains one or more functional groups, preferably selected from OH, COOH, epoxide, ester and ether, $R_2$ may optionally contain double bonds; n is an integer in the range 0-10. Preferably $R_2$ is an alkyl radical having from 1 to 10 carbon atoms containing hydroxyl functional groups and n is an integer in the range 0-5.

Preferred hydrogenated comonomers are selected from the following classes:
  acrylic monomers having the general formula: $CH_2=CH-CO-O-R_2$, wherein $R_2$ is selected from ethylacrylate, n-butylacrylate, acrylic acid, hydroxyalkylacrylates, such as hydroxyethylacrylate, hydroxypropylacrylate, (hydroxy)ethylhexylacrylate;
  vinylether monomers having the general formula: $CH_2=CH-O-R_2$, wherein $R_2$ is selected from propylvinylether, cyclohexylvinylether, vinyl-4-hydroxybutylether;
  vinyl monomers of the carboxylic acid having the general formula: $CH_2=CH-O-CO-R_2$, wherein $R_2$ is selected from vinyl acetate, vinyl propionate, vinyl-2-ethylhexanoate;
  unsaturated carboxylic acid monomers having the general formula: $CH_2=CH-(CH_2)_n-COOH$, wherein n has the above mentioned meaning, for instance vinylacetic acid.

Any of the ECTFE polymers described above can be used in the composition of the invention provided they have a melting temperature not exceeding 210° C., preferably not exceeding 200° C., even not exceeding 198° C., preferably not exceeding 195° C., more preferably not exceeding 193° C., even more preferably not exceeding 190° C. The ECTFE polymer has a melting temperature of advantageously at least 120° C., preferably of at least 130° C., still preferably of at least 140° C., more preferably of at least 145° C., even more preferably of at least 150° C.

The melting temperature is determined by Differential Scanning Calorimetry (DSC) at a heating rate of 10° C./min, according to ASTM D 3418.

The skilled in the art would select within above referenced composition ranges for ECTFE polymers those which will enable obtaining said melting temperatures.

ECTFE polymers having a melting temperature of less than 210° C. typically comprise:
(a) from 30 to 50%, preferably from 35 to 47% by moles of ethylene (E);
(b) from 50 to 70%, preferably from 53 to 65% by moles of chlorotrifluoroethylene (CTFE); and
(c) from 0 to 15%, preferably from 0 to 10% by moles, based on the total amount of monomers (a) and (b), of one or more fluorinated and/or hydrogenated comonomer(s).

Preferably the comonomer is a hydrogenated comonomer selected from the group of the acrylic monomers as above defined. More preferably the hydrogenated comonomer is selected from the group of the hydroxyalkylacrylate comonomers, such as hydroxyethylacrylate, hydroxypropylacrylate and (hydroxy)ethylhexylacrylate.

ECTFE polymers having a melting temperature of less than 210° C. which have been found to give particularly good results are those consisting essentially of recurring units derived from:
(a) from 30 to 50%, preferably from 35 to 47% by moles of ethylene (E);
(b) from 50 to 70%, preferably from 53 to 65% by moles of chlorotrifluoroethylene (CTFE).

End chains, defects or minor amounts of monomer impurities leading to recurring units different from those above mentioned can be still comprised in the preferred ECTFE, without this affecting properties of the material.

The melt flow rate of the ECTFE polymer, measured following the procedure of ASTM 3275-81 at 230° C. and 2.16 Kg, ranges generally from 0.01 to 50 g/10 min, preferably from 0.1 to 20 g/10 min, more preferably from 0.5 to 10 g/10 min.

Optionally, the composition described above can further comprise pigments, filling materials, electrically conductive particles, lubricating agents, heat stabilizer, anti-static agents, extenders, reinforcing agents, organic and/or inorganic pigments like $TiO_2$, carbon black, acid scavengers, such as MgO, flame-retardants, smoke-suppressing agents and the like.

By way of non-limiting examples of filling material, mention may be made of mica, alumina, talc, carbon black, glass fibers, carbon fibers, graphite in the form of fibers or of powder, carbonates such as calcium carbonate, macromolecular compounds and the like.

Pigments useful in the composition notably include, or will comprise, one or more of the following: titanium dioxide which is available form Whittaker, Clark & Daniels, South Plainfield, N.J., USA; Artic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, USA.; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR(R) pigments available from Englehard Industries, Edison, N.J., USA.

According to another embodiment of the invention, the composition as above detailed comprises at least one UV blocker. The selection of the UV blocker is not particularly limited; both organic and inorganic compounds can be used. Preferred UV blockers to be used in the composition of the invention are notably those based on ZnO and/or $TiO_2$. Nanoparticles of ZnO and/or $TiO_2$, possibly coated with coupling agents like, notably, silane coupling agents, can be effectively used.

The composition according to this embodiment of the invention is particularly suitable for manufacturing protective films for photovoltaic modules, in particular for front-sheets or back-sheets of PV cells.

Another aspect of the present invention concerns a process for manufacturing the thermoplastic VDF polymer composition as above described, said process comprising mixing:
the thermoplastic VDF polymer; and
the ECTFE polymer having a melting point of less than 210° C.

According to a preferred variant of the invention, the process comprises advantageously mixing by dry blending and/or melt compounding the VDF polymer and the ECTFE polymer, as above detailed.

Preferably, the process comprises a first step wherein the VDF polymer and the ECTFE polymer are provided under the form of powders and dry blended so as to obtain a powder mixture and a second step wherein said powder mixture is melt compounded. As an alternative, VDF polymer and ECTFE polymer can directly be mixed by melt compounding.

Advantageously, the VDF polymer and the ECTFE polymer are melt compounded in continuous or batch devices. Such devices are well-known to those skilled in the art.

Examples of suitable continuous devices to melt compound the thermoplastic VDF polymer composition of the invention are notably screw extruders. Thus, the VDF polymer and the ECTFE polymer and optionally other ingredients, are advantageously fed in an extruder and the thermoplastic composition of the invention is extruded.

This operating method can be applied either with a view to manufacturing finished product such as, for instance, hollow bodies, pipes, laminates, calendared articles, or with a view to having available granules containing the desired composition, optionally additives and fillers, in suitable proportions in the form of pellets, which facilitates a subsequent conversion into finished articles. With this latter aim, the thermoplastic VDF polymer composition of the invention is advantageously extruded into strands and the strands are chopped into pellets.

Preferably, the VDF polymer and the ECTFE polymer are melt compounded in single-screw or twin-screw extruder. Examples of suitable extruders well-adapted to the process of the invention are those available from Werner and Pfleiderer and from Farrel.

Still another objet of the invention is the use of the thermoplastic VDF polymer composition of the invention for manufacturing films.

Techniques for manufacturing films are well known in the art. The composition of the invention will be preferably processed under the form of a film by cast extrusion or hot blown extrusion techniques, optionally with mono- or bi-axial orientation.

A technique particularly adapted to the manufacture of films of the composition of the invention involve extruding the molten composition through a die having elongated shape so as to obtain an extruded tape and casting/calendering said extruded tape so as to obtain a film.

Tape can be calendered into a film by passing through appropriate rolls, which can be maintained at appropriate temperatures, and whose speed can be adjusted so as to achieve the required thickness.

Films obtained from the composition of the invention are preferably transparent films, i.e. films having a total transmittance of more than 90% when having a thickness of about 50 μm.

Films so obtained are another object of the present invention.

Still within the frame of the present invention is the use of the film obtained from the composition as above detailed as protective films for photovoltaic modules, as films for transportation, industrial and food packaging, for pharmaceutical storage and packaging, cap-stocks, cap-layers.

Should the disclosure of any patents, patent applications, and publications which are incorporated herein by reference conflict with the description of the present application to the extent that it may render a term unclear, the present description shall take precedence.

The invention will be now described in more detail with reference to the following examples, whose purpose is merely illustrative.

PREPARATIVE EXAMPLE

Preparation of ECTFE1

An ECTFE polymer (ECTFE1) having the molar composition 42% E and 58% CTFE was synthesized in an industrial reactor at a temperature of 15° C. and at a pressure of 7.2 absolute bar.

ECTFE1 had the following properties: melting temperature: 185° C.; melt flow rate: 1.4 g/10 min.

Raw Materials—Commercially Available Polymers

PVDF is a VDF homopolymer commercially available under trade name SOLEF® 6010 having a melting point ($T_{m2}$) of 172° C. and a heat of fusion ($\Delta H_{2f}$) of 56 J/g.

ECTFE 2: is a 50/50 mole % E/CTFE copolymer commercially available under trade name HALAR® H-500 having a melting point ($T_{m2}$) of 242° C. and a heat of fusion ($\Delta H_{2f}$) of 42 J/g and a MFI of 18 g/10 min (275° C./2.16 kg).

General Manufacturing Procedure of the Compositions of the Invention—First Set of Runs The VDF polymer and the ECTFE polymer, both under the form of powders, were pre-mixed in a rapid mixer equipped with a three stages paddles mixer so as to obtain a homogeneous powder mixture having required weight ratio between mentioned ingredients. Powder mixture was then processed by extrusion in a double screw 30-34 extruder (LEISTRITZ), equipped with 6 temperature zones and a 4 mm-2 holes die. Temperatures set points were set as follows:

TABLE 1

| Feed zone | T1 | T2 | T3 | T4 | T5 |
| --- | --- | --- | --- | --- | --- |
| 180° C. | 190° C. | 200° C. | 200° C. | 200° C. | 210° C. |

Screws speed was set at 100 rpm, with a feed rate of 20%, so as to yield a throughput rate of about 10 kg/h, and a melt extrudate temperature of 237° C.

Extruded strands were cooled in a water bath, dried, calibrated and cut in a pelletizer.

For manufacturing thin films, pellets were processed in a small single screw extruder Braebender (screw speed=25 rpm) equipped with 5 temperature zones, set as below detailed, and a 0.5 mm×100 mm tape die. Upon exit from the die, molten tape was rolled onto two subsequent chill rolls kept at a temperature of 115° C., whose speed was adapted so as to obtain a film thickness of about 50 μm.

TABLE 2

| Feed zone | T1 | T2 | T3 | T4 |
| --- | --- | --- | --- | --- |
| 230° C. | 230° C. | 230° C. | 240° C. | 240° C. |

Details of weight ratios between ingredients of the compositions are detailed in table 3.

TABLE 3

| | ECTFE polymer | |
| --- | --- | --- |
| Run | type | % wt |
| 1C* | — | 0 |
| 2 | ECTFE-1 | 1 |
| 3 | ECTFE-1 | 3 |
| 4 | ECTFE-1 | 5 |
| 5 | ECTFE-1 | 10 |
| 6 | ECTFE-1 | 20 |

*PVDF alone, used as reference.

Selected compositions so obtained have been analyzed by DSC according to ASTM D 3418; results are summarized herein below:

TABLE 4

| Parameter | unit | Run3 | Run 1C |
| --- | --- | --- | --- |
| $T_{m2}$ | ° C. | 169.9 | 170.2 |
| $DH_{f2}$ | J/g | 56.52 | 60.1 |

No significant difference in melting point of bare VDF polymer and polymer composition of example 3 was found, so that it can be concluded that thermal resistance and properties are not affected by the addition of the ECTFE polymer.

Films Characterization

Films obtained as above detailed were submitted to optical testing. Total luminous transmittance was measured according to ASTM D1003, Procedure A, using a Gardner Haze Guard Plus instrument. For avoiding spurious contributions possibly related to surface roughness or defects, specimens were analyzed by immersing film samples in a quartz cell filled with water. Results summarized in table 4 are the average from three determinations on different specimens. Optical properties obtained for films having 50 μm thickness are summarized in table 4.

TABLE 5

| Run | Film thickness (μm) | TT (%) | Haze |
| --- | --- | --- | --- |
| 1C | 50 | 99.2 | 13.2 |
| 2 | 50 | 98.5 | 4.8 |
| 3 | 50 | 98.7 | 2.7 |

TABLE 5-continued

| Run | Film thickness (μm) | TT (%) | Haze |
|---|---|---|---|
| 4 | 50 | 98.6 | 2.7 |
| 5 | 50 | 98.5 | 3.4 |
| 6 | 50 | 97.8 | 6.5 |

As apparent from table 4 here above, addition of ECTFE polymer enables substantial improvement of Haze of VDF polymer films obtained therefrom.

Sizes of crystalline spherulites have been determined for films of run 1C and 3; spherulites of film from run 10 were found to have a diameter of about 4 μm, while spherulites of film from run 3 were significantly smaller, their diameter being inferior than analytical resolution of optical microscope used in this determination (1 μm).

Water vapour permeability has been also determined both for film of run 1C and film of run 5, at a temperature of 100° C.; results are provided in the following table:

TABLE 6

| Run | Thickness (μm) | ΔP (atm) | P ($cm^3$(STP)xmm/$m^2$xatmxd) |
|---|---|---|---|
| 5 | 50 | 0.9 | 88000 |
| 1C | 50 | 0.9 | 82000 |

As it can be seen, addition of ECTFE polymer does not significantly affect water vapour permeability.

Mechanical Properties

Tensile strength and related properties for compositions obtained in run 1C and 3 were evaluated on specimens punched out from compression moulded plaques according to ASTM D638 standard, Type V (speed travel 1-50 mm) at a temperature of 23° C. Results are summarized in following table.

TABLE 7

| Run | Modulus (MPa) | Yield stress (MPa) | Yield strain (%) | Stress at break (MPa) | Strain at break (%) |
|---|---|---|---|---|---|
| 1C | 1893 ± 40 | 56.2 ± 0.5 | 6.9 | 43.9 ± 15 | 218 ± 156 |
| 3 | 1881 ± 122 | 54.8 ± 0.4 | 6.8 | 46.7 ± 12.6 | 260 ± 174 |

Data provided herein above well demonstrate that mechanical properties of VDF polymer are not negatively affected by the addition of the ECTFE polymer, as above defined.

General Manufacturing Procedure of the Compositions of the Invention—Second Set of Runs The VDF polymer and the ECTFE polymer were processed following same procedure as above detailed, but setting the following temperatures in the double screw 30-34 extruder (LEISTRITZ):

TABLE 8

| Feed zone | T1 | T2 | T3 | T4 | T5 |
|---|---|---|---|---|---|
| 200° C. | 200° C. | 210° C. | 220° C. | 230° C. | 240° C. |

Screws speed was set at 100 rpm, with a feed rate of 20%, so as to yield a throughput rate of about 8.8 kg/h, and a melt extrudate temperature of 253° C.

Extruded strands were cooled in a water bath, dried, calibrated and cut in a pelletizer.

For manufacturing thin films, pellets were processed in 45 mm single screw extruder equipped with conventional three zones screw (L/D=24) without mixing elements. The die used was a flat-die 450 mm wide having a die gap of 550 μm. Upon exit from the die, molten tape was casted on three subsequent chill rolls, whose speed was adapted so as to obtain a film thickness of about 70-75 μm.

Details of weight ratios between ingredients of the compositions are detailed in table 5 and specific temperature conditions for film extrusion in table 6.

TABLE 9

| | ECTFE polymer | |
|---|---|---|
| Run | type | % wt |
| 7C* | — | 0 |
| 8 | ECTFE-1 | 3 |
| 9C | ECTFE-2 | 3 |

*PVDF alone, used as reference.

TABLE 10

| | | | | 9C | |
|---|---|---|---|---|---|
| Film extrusion conditions | | 7C | 8 | Low T (A) | High T (B) |
| T1 | ° C. | 190 | 190 | 190 | 210 |
| T2 | ° C. | 210 | 210 | 210 | 230 |
| T3 | ° C. | 220 | 220 | 220 | 240 |
| T4 | ° C. | 230 | 230 | 230 | 250 |
| T clamp | ° C. | 235 | 235 | 235 | 255 |
| T collar | ° C. | 230 | 230 | 230 | 250 |
| T left side | ° C. | 235 | 235 | 235 | 250 |
| T back side | ° C. | 235 | 235 | 235 | 250 |
| T front side | ° C. | 235 | 235 | 235 | 250 |
| T right side | ° C. | 235 | 235 | 235 | 250 |
| T melt | ° C. | 261 | 263 | 261 | 284 |
| Head pressure | bar | 65 | 62 | 60 | 52 |
| Screw speed | rpm | 11.5 | 10 | 11.5 | 11.5 |
| absorption | A | 19.8 | 19.2 | 21.2 | 15.3 |
| voltage | V | 3 | 3 | 4 | 3 |
| T rolls 1 | ° C. | 100 | 100 | 100 | 100 |
| T rolls 2 | ° C. | 90 | 90 | 90 | 90 |
| Calender speed 1 | m/min | 1.59 | 1.27 | 1.59 | 1.59 |
| Calender speed 2 | m/min | 1.62 | 1.45 | 1.62 | 1.62 |
| Calender speed 3 | m/min | 1.65 | 1.61 | 1.65 | 1.65 |
| Line speed | m/min | 1.67 | 1.71 | 1.67 | 1.67 |
| Film thickness | μm | 75 | 70 | 75 | 75 |

Films obtained as above detailed were submitted to optical testing, following same procedure (ASTM D1003, Procedure A), as detailed above.

Results are summarized here below.

TABLE 11

| Run | Film thickness (μm) | TT (%) | Haze |
|---|---|---|---|
| 7C | 75 | 98.1 | 23.7 |
| 8 | 75 | 98.3 | 7.2 |
| 9C-A | 75 | 97.4 | 36.8 |
| 9C-B | 75 | 96.7 | 26.7 |

It is clear from data provided in Table 8 above that the ECTFE2 having a melting point above 210° C. does not lead to an improvement of the optical properties (low Haze coupled with a high transmittance), even if processed at higher temperatures enabling melting of the same. Moreover the film with ECTFE 2 has a yellow index higher than the other samples extruded.

The invention claimed is:

1. A thermoplastic VDF polymer composition comprising:
   at least one thermoplastic vinylidene fluoride (VDF) polymer, comprising at least 85% by moles of recurring units derived from VDF; and
   at least one ethylene/chlorotrifluoroethylene (ECTFE) polymer,
   wherein said ECTFE polymer possesses a melting point of less than 210° C. and is in an amount of from 0.1 to 20% wt with respect to the total weight of said VDF polymer and said ECTFE polymer.

2. The thermoplastic VDF polymer composition of claim 1, wherein said VDF polymer comprises:
   (a') at least 80% by moles of vinylidene fluoride (VDF);
   (b') optionally from 0.1 to 15% by moles of a fluorinated comonomer selected from the group consisting of vinylfluoride (VF), chlorotrifluoroethylene (CTFE), hexafluoropropene (HFP), tetrafluoroethylene (TFE), perfluoromethylvinylether (MVE), trifluoroethylene (TrFE) and mixtures therefrom; and
   (c') optionally from 0.1 to 5%, by moles, based on the total amount of monomers (a') and (b'), of one or more hydrogenated comonomer(s).

3. The thermoplastic VDF polymer composition of claim 2, wherein said VDF polymer is selected from the group consisting of VDF homopolymers and copolymers of VDF with 0.1 to 10% by moles of a fluorinated comonomer selected from the group consisting of chlorotrifluoroethylene (CTFE), hexafluoropropene (HFP), tetrafluoroethylene (TFE), trifluoroethylene (TrFE) and mixtures thereof.

4. The thermoplastic VDF polymer composition of claim 3, wherein said VDF polymer has a heat of fusion of at least 10 J/g.

5. The thermoplastic VDF polymer composition of any one of claim 1, wherein said ECTFE polymer comprises:
   (a) from 10 to 90% by moles of ethylene (E);
   (b) from 90 to 10% by moles of chlorotrifluoroethylene (CTFE); and
   (c) from 0 to 30% by moles, based on the total amount of monomers (a) and (b), of one or more fluorinated and/or hydrogenated comonomer(s).

6. The thermoplastic VDF polymer composition of claim 5, wherein said ECTFE polymer comprises:
   (a) from 30 to 50% by moles of ethylene (E);
   (b) from 50 to 70% by moles of chlorotrifluoroethylene (CTFE); and
   (c) from 0 to 15% by moles, based on the total amount of monomers (a) and (b), of one or more fluorinated and/or hydrogenated comonomer(s).

7. The thermoplastic VDF polymer composition of claim 1, wherein said composition further comprises pigments, filling materials, electrically conductive particles, lubricating agents, heat stabilizer, anti-static agents, extenders, reinforcing agents, organic and/or inorganic pigments, carbon black, acid scavengers, flame-retardants, and smoke-suppressing agents.

8. The thermoplastic VDF polymer composition of claim 1, said composition comprising at least one UV blocker selected from those based on ZnO and/or $TiO_2$.

9. A process for manufacturing a thermoplastic VDF polymer composition including at least one thermoplastic vinylidene fluoride (VDF) polymer, comprising at least 85% by recurring units derived from VDF; and at least one ethylene/chlorotrifluoroethylene (ECTFE) polymer wherein said ECTFE polymer possesses a melting point of less than 210° C. and is in an amount of from 0.1 to 20% wt with respect to the total weight of said VDF polymer and said ECTFE polymer, said process comprising mixing:
   said thermoplastic VDF polymer; and
   said ECTFE polymer having a melting point of less than 210° C.

10. The process of claim 9 comprising mixing by dry blending and/or melt compounding the VDF polymer and the ECTFE polymer.

11. The process of claim 10, wherein said process comprises a first step wherein the VDF polymer and the ECTFE polymer are provided under the form of powders and dry blended so as to obtain a powder mixture and a second step wherein said powder mixture is melt compounded.

12. The process of claim 10, wherein said VDF polymer and said ECTFE polymer are directly mixed by melt compounding.

13. Method for manufacturing films comprising using a thermoplastic VDF polymer composition including at least one thermoplastic vinylidene fluoride (VDF) polymer, comprising at least 85% by moles of recurring units derived from VDF; and at least one ethylene/chlorotrifluoroethylene (ECTFE) polymer, wherein said ECTFE polymer possesses a melting point of less than 210° C. and is in an amount of from 0.1 to 20% wt with respect to the total weight of said VDF polymer and said ECTFE polymer.

14. The method of claim 13, comprising processing said composition under the form of a film by cast extrusion or hot blown extrusion techniques, optionally with mono- or bi-axial orientation.

15. The method according to claim 14 comprising extruding said composition in the molten form through a die having elongated shape so as to obtain an extruded tape and casting/calendering said extruded tape so as to obtain a film.

16. Films obtained from a thermoplastic VDF polymer composition including at least one thermoplastic vinylidene fluoride (VDF) polymer, comprising at least 85% by moles of recurring units derived from VDF; and at least one ethylene/chlorotrifluoroethylene (ECTFE) polymer, wherein said ECTFE polymer possesses a melting point of less than 210° C. and is in an amount of from 0.1 to 20% wt with respect to the total weight of said VDF polymer and said ECTFE polymer.

* * * * *

UNITED STATES PATENT AND TRADEMARK OFFICE
CERTIFICATE OF CORRECTION

PATENT NO. : 8,642,702 B2  
APPLICATION NO. : 13/643339  
DATED : February 4, 2014  
INVENTOR(S) : Julio A. Abusleme et al.

Page 1 of 1

It is certified that error appears in the above-identified patent and that said Letters Patent is hereby corrected as shown below:

On the Title Page in item (30):

The Foreign Application Priority Data reads: "Apr. 30, 2010  (EP)  10161656,"

should read:

-- Apr. 30, 2010  (EP)  10161656.3 --

In the Claims:

At column 12, claim number 9, line number 10, "..(VDF) polymer, comprising at least 85% by recurring units derived from VDF.." should read:

-- ..(VDF) polymer, comprising at least 85% by moles of recurring units derived from VDF.. --

Signed and Sealed this  
Seventeenth Day of June, 2014

Michelle K. Lee  
*Deputy Director of the United States Patent and Trademark Office*